Sept. 25, 1956 W. HOTINE 2,764,034
ANTIBACKLASH GEAR SYSTEM
Filed Feb. 26, 1953 2 Sheets-Sheet 1
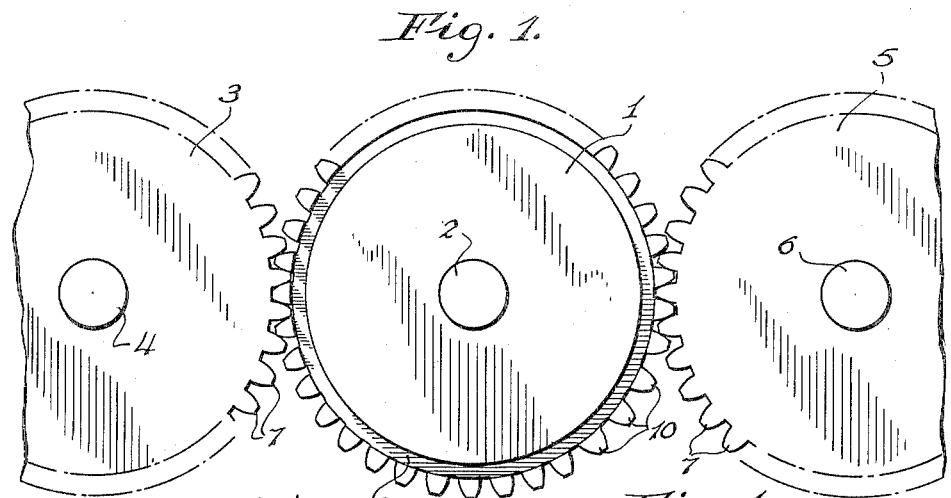
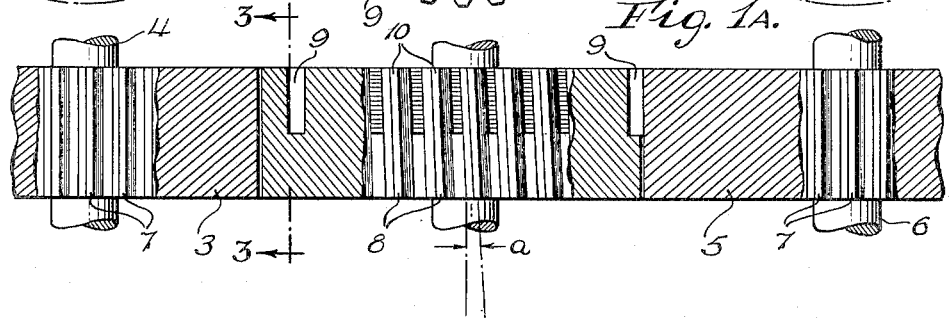
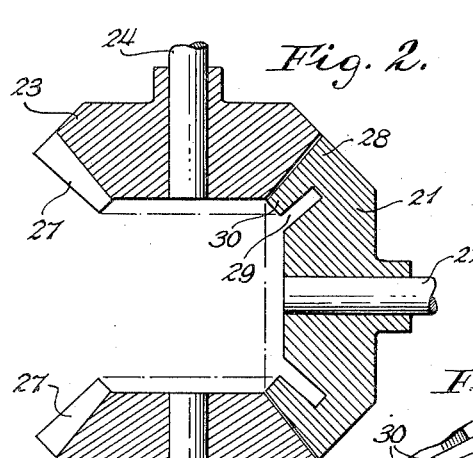
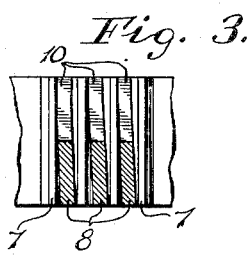
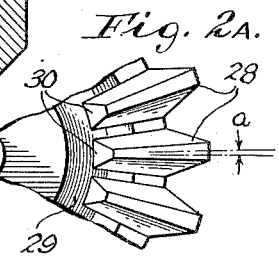
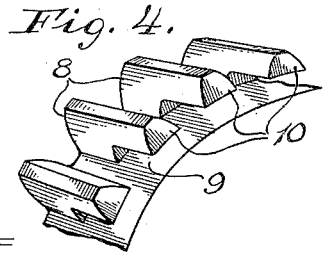
INVENTOR
WILLIAM HOTINE
BY
John C. McGregor
ATTORNEY Sept. 25, 1956  W. HOTINE  2,764,034
ANTIBACKLASH GEAR SYSTEM
Filed Feb. 26, 1953  2 Sheets-Sheet 2

INVENTOR
WILLIAM HOTINE
BY
John C. McGregor
ATTORNEY

United States Patent Office 2,764,034
Patented Sept. 25, 1956

2,764,034

ANTIBACKLASH GEAR SYSTEM

William Hotine, Bayville, N. Y., assignor to Specialties, Inc., Syosset, N. Y., a corporation of New York Application February 26, 1953, Serial No. 338,948

6 Claims. (Cl. 74—440)

This invention relates to high precision gear mechanisms and more particularly to means for minimizing backlash or lost motion between gears.

In many applications, particularly those of a precision nature, it is desirable or necessary to minimize the mechanical backlash. Backlash is looseness or play between gears such that one gear may be rotated an appreciable amount without moving the meshing gears. This is caused by the fact that the gears must be cut loose enough to prevent binding, and the looseness is increased by wearing of the gears. Backlash is a major problem in precision apparatus, for instance, where an input shaft is set relative to a calibrated scale. In many cases gear backlash is a limiting design factor which determines the ultimate accuracy of the apparatus.

In the past many suggestions have been made to eliminate gear backlash. However, all of the suggestions entail an additional load or power requirement upon the prime mover. In the cases of large power equipment, this load is not too objectionable. The only requirement that must be met is that there be sufficient power to overcome the frictional losses in the gear system and to operate the final driven member.

However, in many applications such as instruments, computers and indicating devices, there is not surplus power available to drive a high loss system.

Accordingly a principal object of the invention is to provide means to eliminate backlash and play in gearing, which does not introduce great frictional losses.

Another object of the invention is to provide gears having resilient or flexible teeth which operate to remove backlash and play between gears.

Another object of the invention is to provide gears having teeth which are undercut so that the free ends of the gear teeth are flexible enough to eliminate backlash.

Another object of the invention is to provide gears having resilient construction and having teeth skewed relative to the gear axis.

Another object of the invention is to provide simple and economical means whereby the backlash between mating spur or bevel gears is substantially eliminated.

Another object of the invention is to eliminate backlash between mating gears which may be caused by dimensional variations of the gears, shafts and their mounting distances.

Another object of my invention is to provide means of eliminating backlash to allow a plurality of mating gears to be meshed with a single gear.

These and other objects of the invention will be apparent from the following specification and claims of which:

Figure 1 is a plan view of a spur gear embodiment of the invention;

Figure 1A is a side view of Figure 1;

Figure 2 is a plan view of a bevel gear embodiment of the invention;

Figure 2A is a partial view of Figure 2;

Figure 3 is a diagram illustrative of the operation of the invention;

Figure 4 is an isometric view of an embodiment of the invention;

Figure 5:
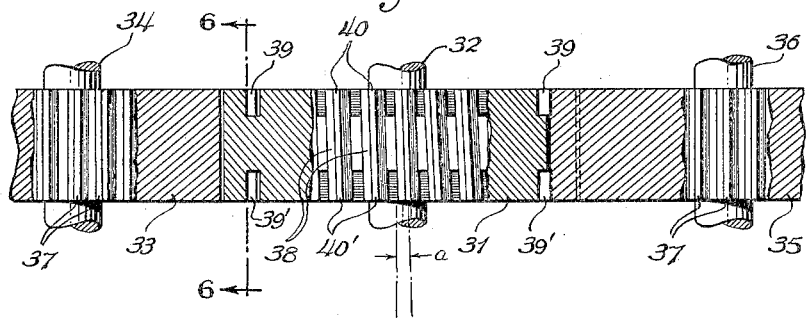
Figure 5 is a sectional view of an embodiment of the invention having doubly undercut gears.

Referring to Figures 1, 1A and 4, which illustrate a spur gear mechanism constructed according to my invention, gears 1, 3 and 5 are mounted on their respective shafts 2, 4 and 6, with gear 3 meshing with gear 1 and gear 1 meshing with gear 5. Gears 3 and 5 have teeth 7 which are made according to the American standard tooth form with the face and flank of the tooth parallel to the axis of the gear. Gear 1 is also constructed according to the American standard tooth form but with the face and flank of the tooth skewed to the small angle "a" from the axis of the gear. Gear 1 also has a circular undercut 9, the outside diameter of which cuts into the bottom land of the tooth along a distance of approximately one-half of the tooth face width. One end 10 of each tooth of gear 1 thus extends freely and independently over the undercut 9 and this end 10 can be flexed or deflected to a limited extent which depends on the dimensions and elasticity of the tooth. The gear 1 is therefore preferably made from an elastic material. The angle "a" of the tooth skew of gear 1 is selected so that the end 10 of a tooth 8 is slightly deflected, as illustrated in Figure 3, when meshed with the straight teeth 7 of gears 3 and 5. The faces of the mating gear teeth are thus always in contact, with a loading or pressure on the tooth faces dependent on the deflection of the teeth 10 of gear 1, so that there is no backlash or lost motion. As each tooth of gear 1 is independently loaded, a plurality of gears such as gears 3 and 5 can be meshed with gear 1 and the system may be made free of gear tooth backlash, regardless of limited dimensional variations of the components, such as may be encountered at manufacture, during periods of wear, and during operation at abnormally wide temperature ranges. Either the straight or the skewed teeth may be flexible.

Referring to Figures 2 and 2A which illustrate a bevel gear mechanism constructed according to my invention, gears 21, 23 and 25 are mounted on their respective shafts 22, 24 and 26, with gears 21 and 23 meshing, and with gears 21 and 25 meshing. Gears 23 and 25 have teeth 27 which are made according to standard tooth form, with the face and flank of the tooth at the pitch line lying on the pitch line radius. Gear 21 has teeth 28 which are made according to standard tooth form but with the face and flank of the tooth at the pitch line skewed at a small angle "a" from the pitch line radius, and with a circular undercut 29, the outside diameter of which cuts into the bottom land of the tooth along a distance of approximately one-half of the tooth face width. One end 30 of each tooth of gear 21 thus extends freely and independently over the undercut 29 and this end 30 can be flexed or deflected to a limited extent which depends on the dimensions and elasticity of the tooth. The gear 21 is therefore preferably made from an elastic material. The angle "a" of the tooth skew of gear 21 is selected so that the end 30 of a tooth is slightly deflected when meshed with the straight teeth of gears 23 and 25. The faces of the mating gear teeth are thus always in contact with a loading or pressure on the tooth faces dependent on the deflection of the teeth 30 of gear 21. This eliminates backlash or lost motion.

As before, each tooth of gear 21 is independently loaded. This permits a plurality of gears such as gears 23 and 25 to be meshed with gear 21. In this way the system may be made free of gear tooth backlash. This elimination of backlash is achieved even with limited dimensional variations of the components such as may be encountered at manufacture or due to wear. Furthermore, the novel construction assures freedom from backlash over wide ranges of temperature. From the above it is realized that my novel gear design provides means for eliminating backlash and play. By providing gears having independently flexible teeth, it is possible to make a gear train with little frictional load and no backlash. Gears constructed in accordance with my invention are simple and economical to manufacture. Furthermore, it is possible to construct gear trains free of backlash without being concerned with dimensional variations of the gear themselves, the mounting shafts and the mounting distances.

Figures 5 to 8 show another embodiment of the invention having a double undercut one on each side. In this embodiment the gear tooth will flex at each end to provide anti-backlash operation as previously described.

Figure 5 shows a set of meshing spur gears, 31, 33 and 35 mounted on shafts 34, 32 and 36 respectively. The teeth 38 of gear 31 have undercuts 39 and 39' at each end 40 and 40', and are skewed at an angle "a" with respect to the shaft 32. The teeth 37 of the gears 33 and 35 are conventional straight gears.

Figure 7:
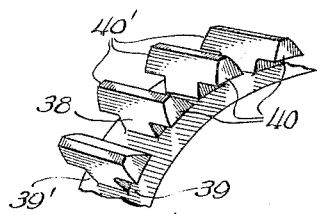
Figure 7 is an isometric view of a doubly undercut gear.
Figure 6:
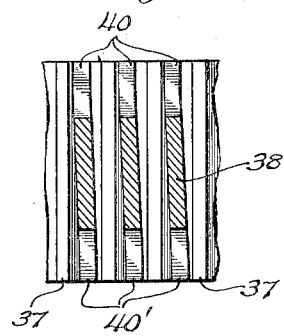
Figure 6 is a view illustrative of the operations of the embodiment of Figure 5.

Figure 6 shows the flexing of the undercut teeth 40, 40' relative to the straight teeth 37 of gear 33. The flexing will take up backlash between the gears. Figure 7 shows an isometric view of the double undercut gear.

Figure 8:
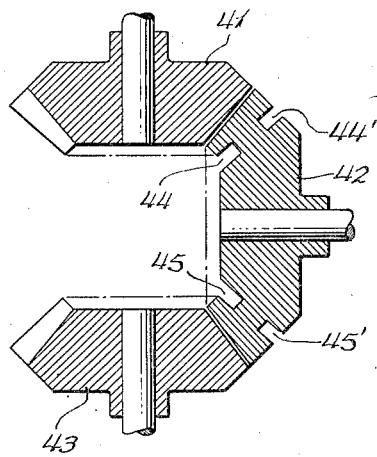
Figure 8 is a sectional view of a doubly undercut bevel gear arrangement.

Figure 8 shows a bevel gear arrangement having double undercuts. It shows conventional gears 41 and 43 meshing with gear 42 having double undercuts as at 44, 44' and 45, 45'.

It is to be understood that my invention is not restricted to the specific embodiments herein disclosed. For instance, gears with spiral or helical teeth may be used instead of gears with straight teeth. Composite gears in which the teeth are resilient and the supporting body rigid may be used in order to utilize the best characteristics of available materials, or to secure better structural design.

The construction can be reversed, with the flexible teeth parallel to the gear axis, while the mating gear has rigid teeth which are skewed.

Special tooth forms may be employed, providing the skew between mating gear teeth is maintained, plus flexibility of teeth of one gear.

Besides taking up backlash, this system may be used to cushion shock which is transmitted through to gear train when a mechanical stop is used to halt its movement suddenly, and thus prolong the life of gears and bearings.

In some cases, take up for wear may be more important. In these cases, perhaps more friction can be tolerated and a more pronounced angle of skew would be used.

I claim:

1. An anti-backlash spur gear comprising a disc-like body portion and a plurality of teeth along the periphery of said body portion, each of said teeth having its faces and flank skewed at a small angle from the axis of said gear, said body portion having a circular undercut, the outer diameter of said circular undercut cutting into the bottom land of each of said teeth.

2. Apparatus as in claim 1 wherein said undercut has a depth equal to one-half of the width of the faces of said teeth.

3. An anti-backlash bevel gear comprising a body portion having a beveled face and a plurality of teeth fixed to said beveled faces, each of said teeth having its face and flank skewed at a small angle from the axis of said body portion, said body portion having a beveled circular undercut, the outer diameter of said undercut being of such a magnitude so as to cut into the bottom land of each of said teeth.

4. Apparatus as in claim 3 wherein said undercut has a depth equal to one-half the width of the faces of said teeth.

5. A precision gear comprising a disc-like body portion, a rim portion attached to said body portion, the width of said rim portion being less than the width of said body portion, and a plurality of teeth affixed to said rim portion, said teeth extending axially from the face of said rim portion and having their longitudinal axes slightly skewed to the axis of said body portion.

6. An anti-backlash shock absorbing spur gear comprising a disc-like body portion and a plurality of teeth along the periphery of said body portion, each of said teeth having its faces and flank skewed at a small angle from said gear axis, said body portion having circular undercuts, the outer diameter of said circular undercuts cutting into the bottom land at each end of said teeth.

References Cited in the file of this patent

UNITED STATES PATENTS 2,335,504 Gazda _____ Nov. 30, 1943

FOREIGN PATENTS 570,192 Great Britain _____ June 26, 1945